United States Patent [19]

Jeon

[11] Patent Number: 6,104,855
[45] Date of Patent: Aug. 15, 2000

[54] TERMINAL ASSEMBLY FOR A MULTIPLE FIBER OPTIC CABLE

[75] Inventor: Yong Han Jeon, Incheon, Rep. of Korea

[73] Assignee: Daewoo Telecom Ltd., Incheon, Rep. of Korea

[21] Appl. No.: 09/163,165

[22] Filed: Sep. 30, 1998

[30] Foreign Application Priority Data

Sep. 30, 1997 [KR] Rep. of Korea ............ 97-49930
Oct. 6, 1997 [KR] Rep. of Korea ............ 97-51191

[51] Int. Cl.$^7$ ................................................. G02B 6/00
[52] U.S. Cl. ............................ 385/139; 95/135; 95/137
[58] Field of Search ................. 385/94–99, 134–139

[56] References Cited

U.S. PATENT DOCUMENTS 5,231,688 7/1993 Zimmer ............................ 385/139

*Primary Examiner*—Phan T. H. Palmer
*Attorney, Agent, or Firm*—Rosenman & Colin LLP

[57] ABSTRACT

A terminal assembly for an optic cable equipped with terminal connectors is provided with a housing having a small through-hole and a large through-hole. A plug for keeping optical fibers within the housing to prevent the optical fibers from getting entangled with one another is mounted within the housing. Through the use of a nut member fixed to the cable, the housing is fixed to the cable. A flexible cap member for enclosing the optical fibers and the terminal connectors is combined with the housing to enclose them.

16 Claims, 9 Drawing Sheets

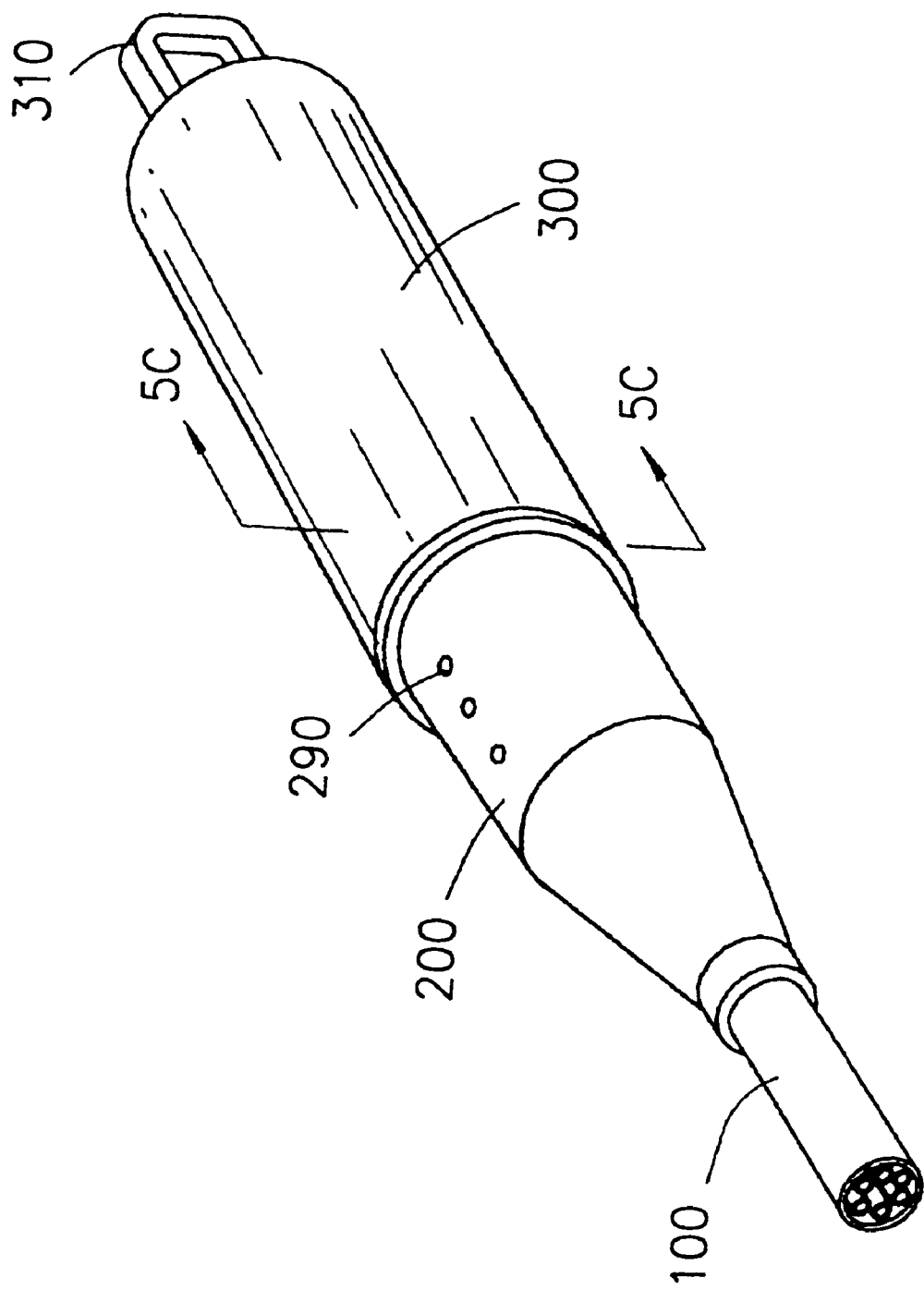

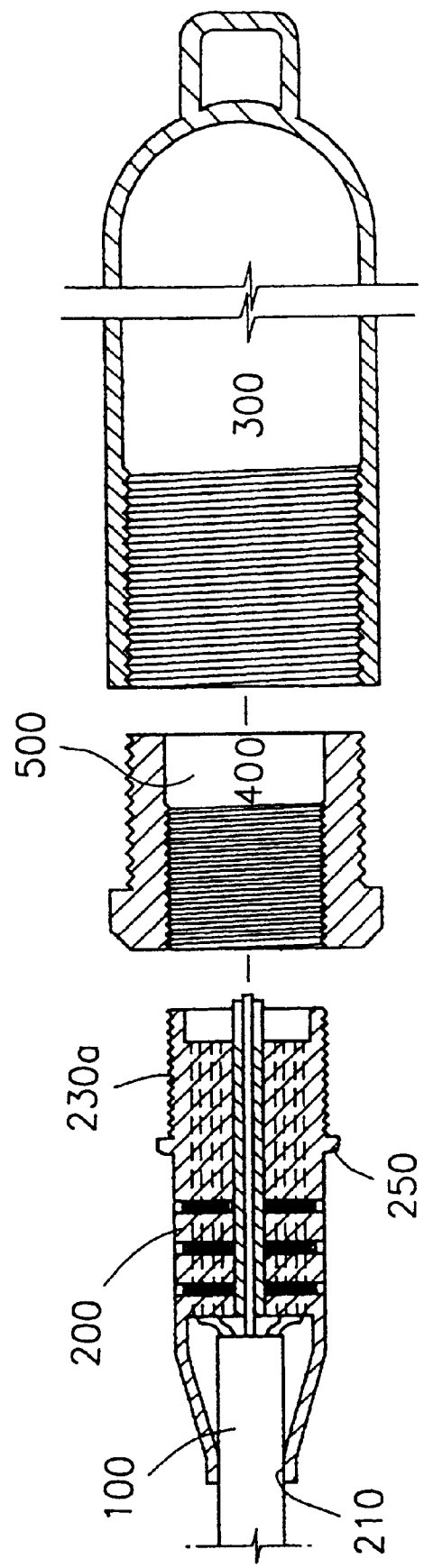

TERMINAL ASSEMBLY FOR A MULTIPLE FIBER OPTIC CABLE

FIELD OF THE INVENTION

The present invention relates to a terminal assembly for a multiple fiber optic cable; and, more particularly, to a terminal assembly for preventing a multiple fiber optic cable together with terminal connectors secured at free ends of the optical fibers from being damaged during an installation of the multiple fiber optic cable.

DESCRIPTION OF THE PRIOR ART

In general, splicing of fiber optic cables, i.e., connecting one fiber optic cable to another, requires the provision of a pair of terminal connectors, one of which being a connector receptacle secured to one of the cables and the other being a connector plug secured to the other. The splicing operation is usually extremely difficult to carry out since it is normally made at a narrow cable tunnel, a termination of a cable protecting pipe or a wiring closet. For this reason, in a normal installation of the fiber optic cable, terminal connector or splicer is connected to an end of the optical fiber prior to being inserted into the underground protecting pipe or the like until the end of the cable is revealed. However, in such a situation, there is a likelihood of the optical fiber, including the terminal connector attached to the end thereof, being damaged, and to prevent such an occurrence, a terminal assembly has been proposed.

One example of the terminal assembly is disclosed in U.S. Pat. No. 5,231,688 issued to Zimmer et al., where a furcation kit comprising a securing means for securing a fiber optic cable, an optical plug having a plurality of fiber passages, a jack member for receiving the optical plug and a support member is taught.

However, since the prior art terminal assembly described above is developed to solve mainly a furcating problem of the optical fibers, it has a disadvantage in that it cannot be easily inserted into the cable protecting pipe and even if it was inserted the pipe, it cannot then be moved within the pipe. Actually, the furcation kit is somewhat bulky to be introduced into the pipe and lacks flexibility required to comply with, e.g., curved sections of the pipe.

SUMMARY OF THE INVENTION

It is, therefore, a primary object of the invention to provide a terminal assembly designed to facilitate an introduction thereof into a cable protecting pipe, efficiently protecting an optic fiber and/or terminal connector from the surroundings.

The above and other objects of the invention are accomplished by providing a terminal assembly for an optic cable provided with a plurality of optical fibers whose end is equipped with a terminal connector for splicing said optical fiber, said terminal assembly comprising: a housing including a small through-hole, a large through-hole having a diameter larger than that of the small through-hole and a keeping means for keeping the optical fibers therewithin to prevent the optical fibers from getting entangled with one another; a fixing means for fixing the housing to the optic cable; and a cap member for enclosing the optical fibers and the terminal connectors and being detachably combined with said housing.

BRIEF DESCRIPTION OF THE DRAWINGS

The above and other objects and features of the instant invention will become apparent from the following description of preferred embodiments taken in conjunction with the accompanying drawings, in which:

FIG. 4 illustrates a perspective view of a second embodiment of a terminal assembly which is for a fiber optic cable having a tension member in accordance with the present invention;

FIG. 8 illustrates a sectional view of the inventive terminal assembly having an intermediate thread member.

DETAILED DESCRIPTION OF THE PREFERRED EMBODIMENTS

Referring to FIGS. 1 to 3b, there is shown a first embodiment of the inventive terminal assembly. The terminal assembly in accordance with the first embodiment is suitable for a multiple fiber optic cable for an indoor use without a tension member or a central strength member.

In FIGS. 1 through 3b, the terminal assembly for the multi fiber optic cable without the tension member includes a housing 20, a cap member 30, a plug 40 and a nut member 50.

Figure 1:
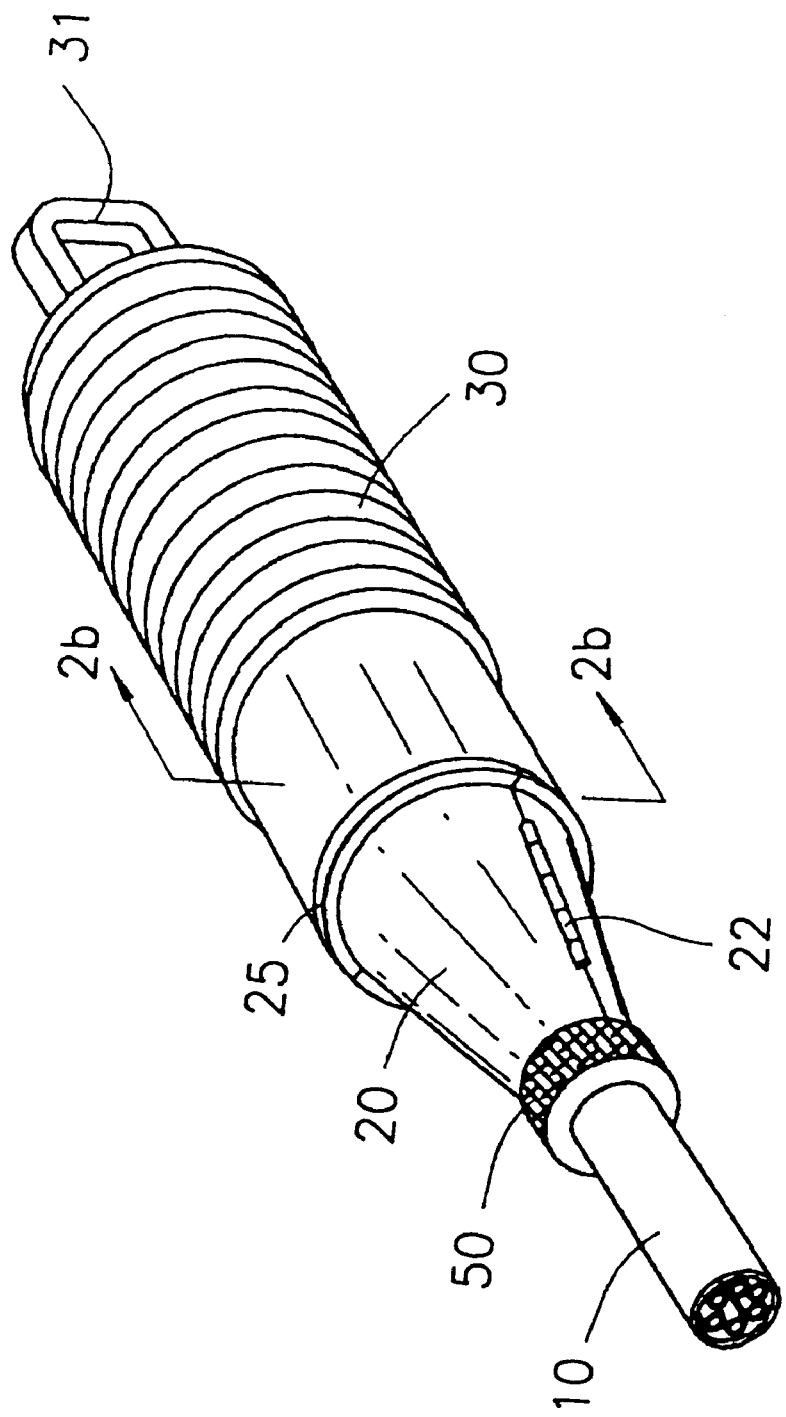
FIG. 1 illustrates a perspective view of a first embodiment of a terminal assembly for a fiber optic cable without a tens n member in accordance with the present invention.
Figure 2A:
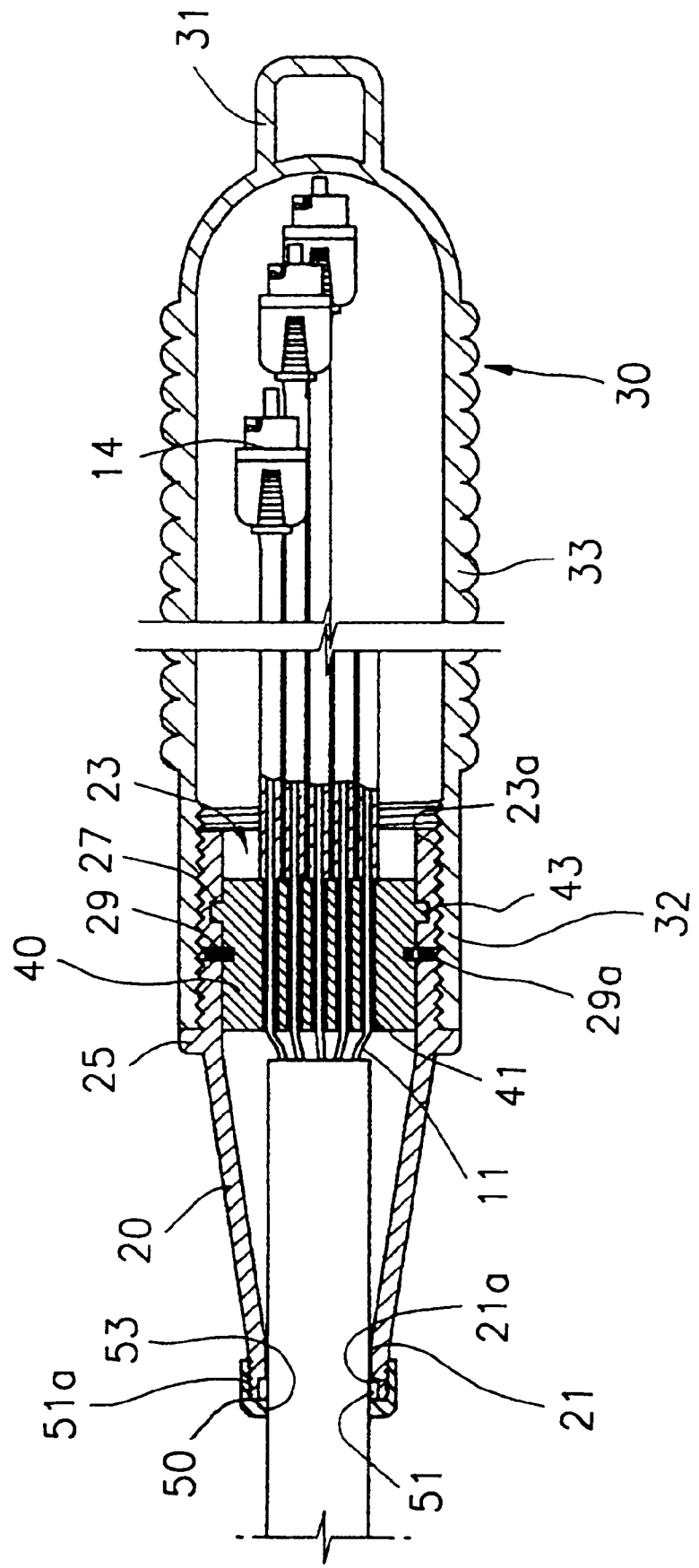
FIG. 2a illustrates a longitudinal sectional view of the inventive terminal assembly shown in FIG. 1.
Figure 2B:
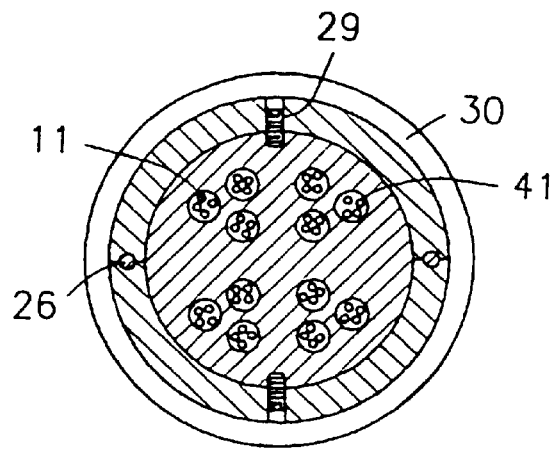
FIG. 2b illustrates a sectional view of the inventive terminal assembly shown in FIG. 1, when taken along a line 2b—2b.

As shown in FIG. 1, the housing 20 includes a pair of semicircular units rotatably connected with each other via a hinge 22. The housing 20 has a flange 25 protruding from a middle portion thereof. As shown in FIG. 2a, a leading portion of the housing 20 about the flange 25 has a tapered shape and a rear portion of the housing 20 has a cylindrical shape. An end of the leading portion has a small through-hole 21 through which the multi fiber optic cable is introduced. Further, the end of the leading portion has a small thread 21a formed around thereof. Preferably, the small thread 21a has diameter which increases along a direction from the leading portion to the rear portion. An end of the rear portion has a large through-hole 23 having a diameter larger than that of the small through-hole. The rear portion has a large thread 23a formed over a length of the rear portion. Formed inside the rear portion is a pair of blind holes 27. A pair of tap holes 29 is laterally formed through the rear portion and screws 29a are driven into the tap holes 29, respectively, to secure the plug 40 within the housing 20. The pair of blind holes 27 serve to receive protrusions 43 of the plug 40, respectively.

The cap member 30 includes a thread portion 32 and a flexible portion 33. The cap member 30 serves to enclose the multi fiber optic cable 10 and terminal connectors 14 from the surroundings. As is well known in the art, the terminal connector 14 is needed to splice one optical fiber 11 to another and is kept on an end of the optical fiber by, e.g., a plastic tube(not shown) covering the optical fiber 11. The cap member 30 is combined with the housing 20 via an engagement between the large thread 23a and the thread portion 32. The flexible portion 33 is made in a bellows form with a metal so that the terminal assembly can easily comply with a curve profile of an underground cable protecting pipe, when it is installed through the pipe. The cap member 30 has a handle 31 to be used when the user pulls a rope or wire binding the handle 31 for the installation of the multi fiber optic cable within the underground cable protecting pipe.

Figure 3A:
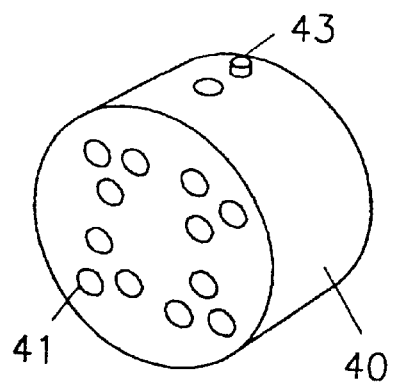
FIGS. 3a and 3b illustrate perspective views of a loose type plug and a slot type plug employed in the inventive terminal assembly shown in FIG. 1, respectively.
Figure 3B:
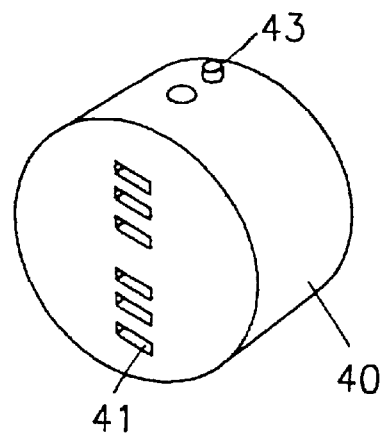

The plug 40 serves to support and locate the optical fibers 11 of the multi fiber optic cable 10 within the housing 20 to prevent the optical fibers 11 from getting entangled with one another. The plug 40 has a diameter substantially equal to that of the inside of the rear portion and is fixed within the housing 20 by the screws 29a and the protrusions 43. The plug 40 has a plurality of passages 41 through which the optical fibers 11 are positioned, respectively. The passages 41 can be arranged in the plug 40 in a different manner depending upon the kind of the fiber optic cable 10. For example, the plug 40 shown in FIG. 3a may be used, when the terminal assembly is applied to a loose type fiber optic cable. Further, the plug 40 shown in FIG. 3b is suitable for a ribbon type fiber optic cable.

Returning to FIG. 2a, the nut member 50 has a receiving hole 53 having a diameter substantially equal to or smaller than that of a sheath of the multi fiber optic cable 10, so that the multi fiber optic cable 10 can be fitted into the receiving hole 53, being firmly fixed to a same. Further, the nut member 50 has a female thread 51a engaged with the small thread 21a of the housing 20.

On the other hand, reference numeral 51 represents a bushing member which assists the nut member 50 grasping the multi fiber optic cable 10. When the housing 20 is assembled into the nut member 50, the bushing member 51 is depressed by the end of the housing 20 and the nut member 50.

Assembling operation of the first embodiment of the inventive terminal assembly constructed in this manner is now described with reference to FIGS. 1 to 3b.

First, the multi fiber optic cable 10 is inserted into the receiving hole 53 and the bushing member 51 and then stripped over a predetermined length, thereby exposing the optical fibers 11 therein. After that, the exposed optical fibers 11 are inserted into the passages 41 of the plug 40, respectively, and then the terminal connectors 14 are mounted to ends of the optical fibers 11, respectively. Thereafter, the plug 40 is positioned on one semicircular unit of the housing 20. At the same time, the multi fiber optic cable 10 is positioned on the small through-hole 21 of one semicircular unit. Next, the other semicircular unit is rotated to make the housing 20 a circular shape. At this time, a sealing member 26 ensures sealing relationship between contact surfaces of the semicircular units. Next, the housing 20 of the circular shape is driven into the nut member 50 to be combined therewith. Since the small thread 21a has the diameter increasing along the direction from the leading portion to the rear portion, in the course of driving the housing 20 into the nut member 50, two semicircular units become progressively closely contacted with each other. After that, the cap member 30 is engaged with the housing 20 to surround the terminal connectors 14. Finally, the pair of screws 29a is driven into the pair of tap holes 29, respectively, to secure the plug 40 within the housing 20.

A second embodiment of the inventive terminal assembly is now described with reference to FIGS. 4 through 8. The terminal assembly in accordance with the second embodiment is suitable for a multiple fiber optic cable 100 for an outdoor use with a tension member 110 required to endure the weight of the cable 100. Further, in the second embodiment, the plug 40 in the first embodiment is integrally formed with a housing 200 rather than existing as a separate member.

Figure 5A:
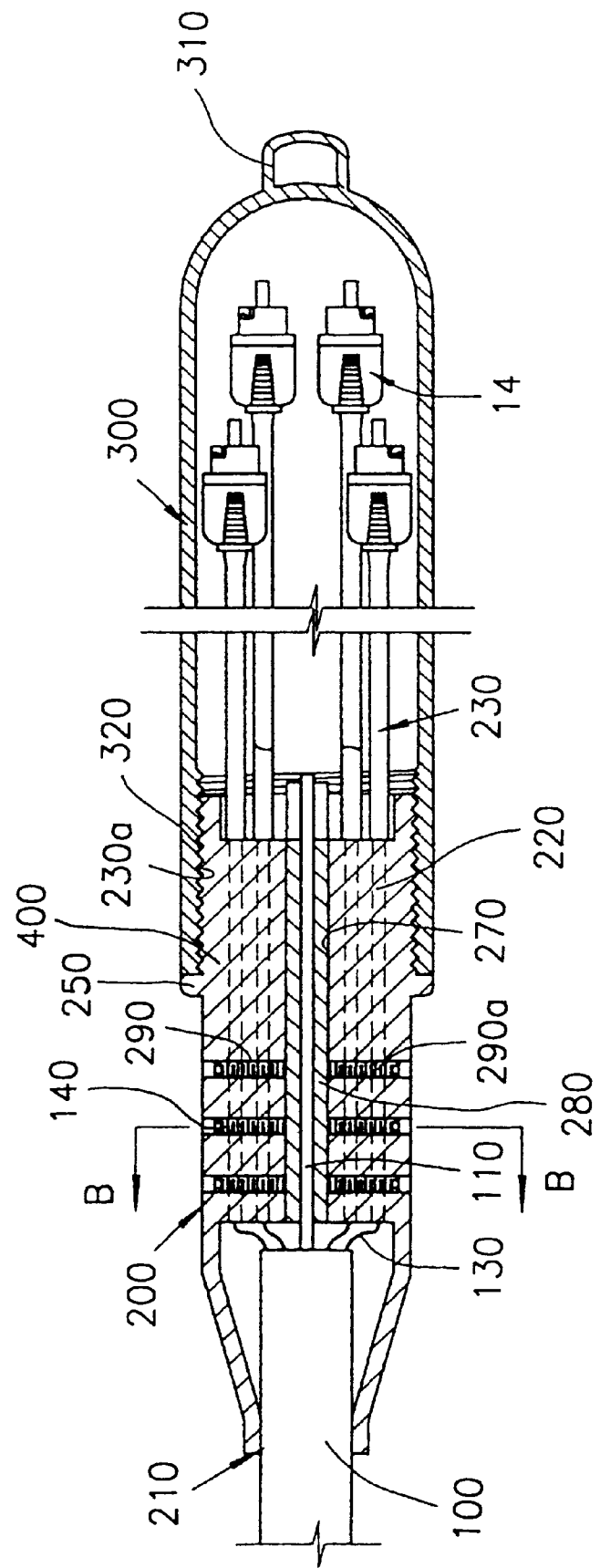
FIG. 5a illustrates a longitudinal sectional view of the inventive terminal assembly shown in FIG. 4.
Figure 5B:
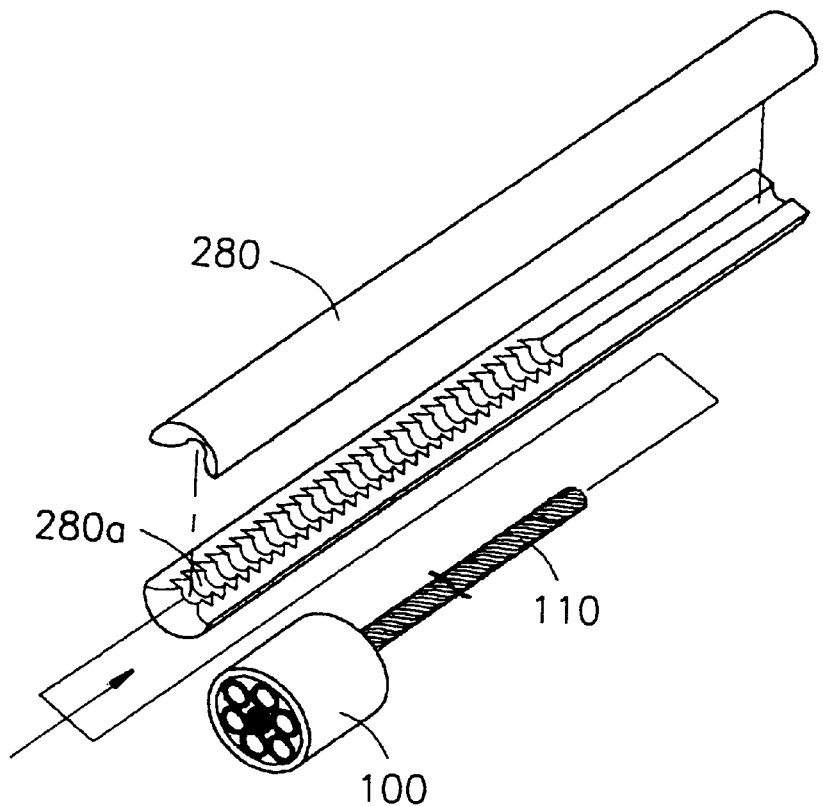
FIG. 5b illustrates a perspective view of the fiber optic cable with the tension member and a damper of the inventive terminal assembly shown in FIG. 4.

In FIGS. 4 through 5b, the terminal assembly for the multi fiber optic cable 100 with the tension member 110 is largely divided into a housing 200 and a cap member 300.

As shown in FIGS. 4 and 5a, the housing 200 has a leading portion with a tapered shape and a rear portion with a cylindrical shape. The housing 20 also has a flange 250 protruding from a middle portion thereof. An end of the leading portion has a small through-hole 210 through which the multi fiber optic cable 100 is introduced. An end of the rear portion has a large through-hole 230 having a diameter larger than that of the small through-hole 210. The rear portion has a large thread 230a formed over a length of the rear portion.

Figure 7A:
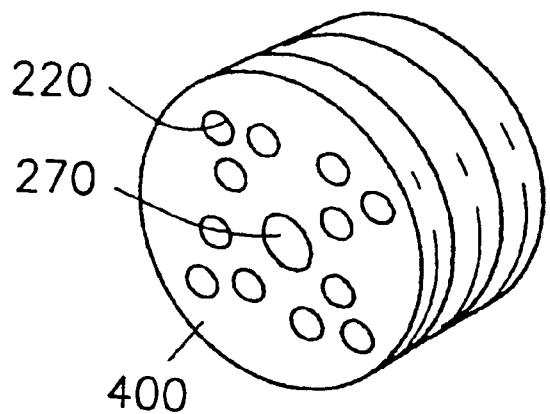
FIGS. 7a and 7b illustrate perspective views of a loose type plug and a slot type plug employed in the inventive terminal asses shown in FIG. 4, respectively.
Figure 7B:
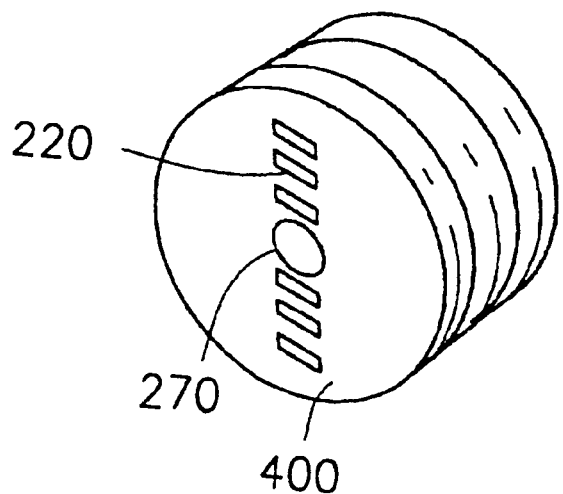

Integrally formed inside the rear portion is a plug 400 which has a plurality of passages 220 through which the optical fibers 130 are positioned, respectively. The passages 220 serve to support and locate the optical fibers 130 of the multi fiber optic cable 100 within the housing 200 to prevent the optical fibers 130 from getting entangled with one another. The passages 220 can be arranged in the plug 400 in a different manner depending upon the kind of the fiber optic cable 100. For example, the plug 400 shown in FIG. 7a may be used, when the terminal assembly is applied to the loose type fiber optic cable. Further, the plug 400 shown in FIG. 7b is suitable for the ribbon type fiber optic cable. In accordance with the present invention, as shown in FIGS. 7a and 7b, the plug 400 made in a separate form can be employed.

Figure 5C:
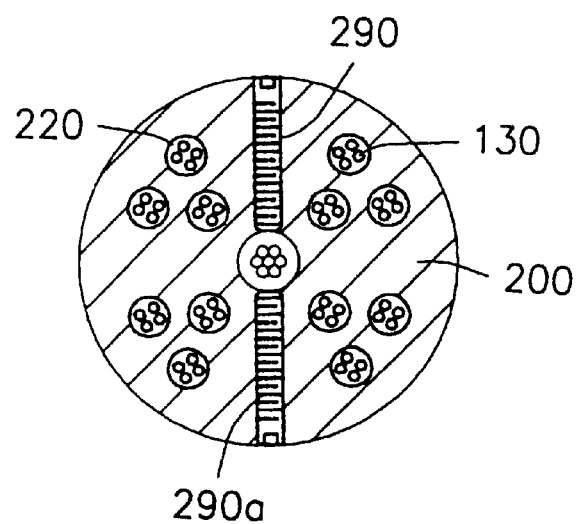
FIG. 5c illustrates a sectional view of the inventive terminal assembly shown in FIG. 4, when taken along a line 5c—5c.

Returning to FIG. 5a, a clamp hole 270 is formed through the plug 400 along a longitudinal direction of the housing 200, being centered therewith. Three sets of a pair of tap holes 290 are formed through the plug 400 and the housing 200 in a radial direction of the sames 400 and 200 and communicate with the clamp hole 270, as shown in FIG. 5c. The pair of tap holes 290 are opposed to each other and screws 290a are driven into the tap holes 290, respectively, to secure the tension member 110 within the clamp hole 270 by depressing the tension member 110.

As one modification of fixing the tension member 110, a damper 280 may be used between the tension member 110 and the screws 140, as shown in FIG. 5b. The damper 280 is constituted with a pair of semi-circular bars, each of which has a plurality of tooth 280a. The tooth 280a are formed in such a manner as to permit the tension member 110 to movable in only one direction along an axis of the damper 280, when the tension member 110 is positioned between the semi-circular bars, being depressed by the same. The damper 280 has an inner diameter defined with the tooth 280a which increases along an arrow in FIG. 5b. In this modification, the screws depress the damper 280.

Figure 6A:
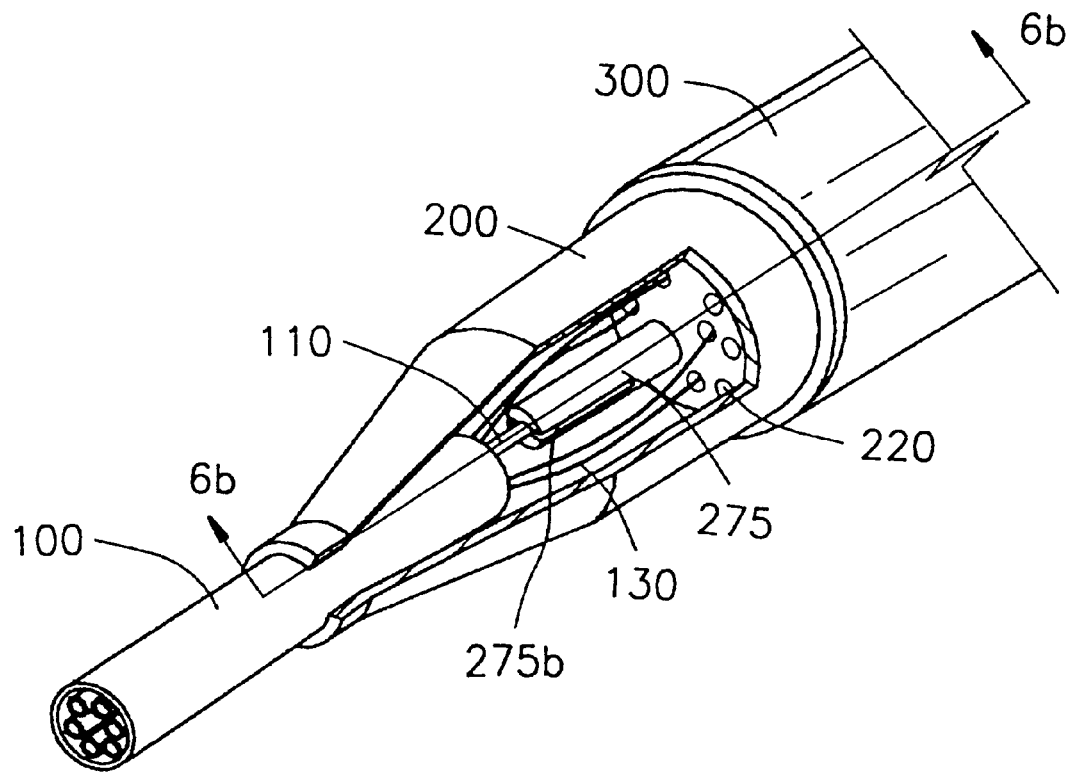
FIG. 6a illustrates a partially cutaway perspective view of a housing showing the fiber optic cable having the tension member fixed therein.
Figure 6B:
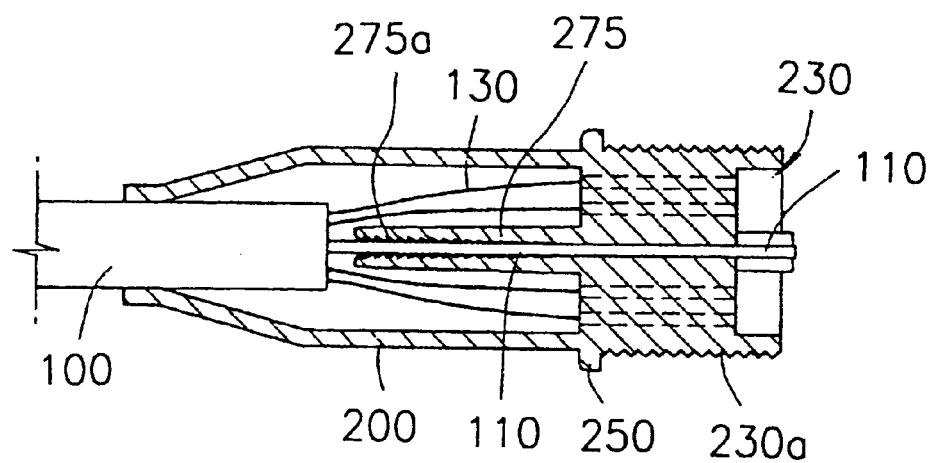
FIG. 6b illustrates a sectional view of the inventive terminal assembly shown in FIG. 6a, when taken along a line 6b—6b.

As another modification of fixing the tension member 110, a protruding damper 275 protruding from the plug 400 can be integrally formed with the plug 400, as shown in FIGS. 6a and 6b. The protruding damper 275 has tooth 275a which are formed in such a manner as to permit the tension member 110 to movable in only one direction along an axis of the plug 400. As shown in FIG. 6a, in order to facilitate an insertion of the tension member 110 into the protruding damper 275, a longitudinal slot 275b is formed with a leading portion of the protruding damper 275. Forming the longitudinal slot 275b at the loading portion allows the protruding clamper 275 to become partially separable at the leading portion to provide wide opening for the tension member 110.

The cap member 300 includes a thread portion 320. The cap member 300 serves to enclose the multi fiber optic cable 100 and terminal connectors 14. The cap member 300 is combined with the housing 200 via an engagement between the large thread 230a and the thread portion 320. Further, the cap member 300 has a handle 310. In the second embodiment, the cap member 300 can also be made in the bellows form as shown in the first embodiment, although not shown in the drawings.

As shown in FIG. 8, an intermediate thread member 500 may be used in the inventive terminal assembly. The intermediate thread member 500 can be used, if there exists a dimensional difference between the housing 200 and the cap member 300. The intermediate thread member 500 has an outer male thread 510 engageable with the thread portion 320 of the cap member 300 and an inner female thread 520 engageable with the thread 230a of the housing 200. The use of the intermediate thread member 500 enables the space within the cap member 30 and 300 to be extended.

Although the invention has been shown and described with respect to the preferred embodiments, it will be understood by those skilled in the art that various changes and modifications may be made without departing from the spirit and scope of the invention as defined in the following claims.

What is claimed is:

1. A terminal assembly for an optic cable provided with a plurality of optical fibers whose end is equipped with a terminal connector for splicing said optical fiber, said terminal assembly comprising:

a housing including a small through-hole and a large through-hole having a diameter larger than that of the small through-hole, and a keeping means for keeping the optical fibers therewithin to prevent the optical fibers from getting entangled with one another;

a fixing means for fixing the housing to the optic cable; and a cap member for enclosing the optical fibers and the terminal connectors and being detachably combined with said housing.

2. The terminal assembly of claim 1, wherein said fixing means comprises:

a small thread formed around said small through-hole;

a nut member including a receiving hole into which the optic cable is closely fitted, and a female thread being engaged with the small through-hole; and a bushing member for assisting the nut member grasping the optic cable and being depressed by the end of the housing and the nut member.

3. The terminal assembly of claim 2, wherein the small thread has a diameter increasing along a direction from the small through hole to the large through hole.

4. The terminal assembly of claim 1, wherein the housing is constituted with a pair of semicircular units rotatably connected with each other via a hinge.

5. The terminal assembly of claim 4, wherein said semi-circular units have a sealing on their contact surfaces to ensure a seal of the housing.

6. The terminal assembly of claim 1, wherein said keeping means comprises a plug detachably mounted within the housing and having a plurality of passages through which the optical fibers pass, respectively.

7. The terminal assembly of claim 1, wherein said keeping means comprises a plug integrally formed with the housing and having a plurality of passages through which the optical fibers pass, respectively.

8. The terminal assembly of claim 1, wherein said cap member has a flexibility.

9. The terminal assembly of claim 1, further comprising an intermediate thread member for connecting the cap member to the housing, between the cap member and the housing.

10. A terminal assembly for an optic cable provided with a tension member and a plurality of optical fibers whose end is equipped with a terminal connector for splicing said optical fiber, said terminal assembly comprising:

a housing including a small through-hole and a large through-hole having a diameter larger than that of the small through-hole, and a plug for keeping the optical fibers therewithin to prevent the optical fibers from getting entangled with one another, the plug having a clamp hole through which the tension member is positioned;

a plurality of tap holes formed through the plug and the housing in a radial direction of the plug and the housing to communicate with the clamp hole;

a plurality of screws driven into the tap holes, respectively, to secure the tension member within the clamp hole by depressing the tension member; and a cap member for enclosing the optical fibers and the terminal connectors and being detachably combined with said housing.

11. The terminal assembly of claim 10, wherein said plug is integrally formed with the housing.

12. The terminal assembly of claim 10, wherein said plug is detachably mounted within the housing.

13. The terminal assembly of claim 10, wherein said cap member has a flexibility.

14. The terminal assembly of claim 10, further comprising a separate damper being positioned within the clamp hole and provided with a pair of semi-circular bars between which the tension member is positioned, each of the semi-circular bars having a plurality of tooth which are formed in such a manner as to permit the tension member to be movable in one longitudinal direction of the housing.

15. The terminal assembly of claim 10, further comprising a protruding damper extending from the plug in a coaxial relationship with the clamp hole and having a plurality of tooth which are formed in such a manner as to permit the tension member to be movable in one longitudinal direction of the housing, and a longitudinal slot.

16. The terminal assembly of claim 10, further comprising an intermediate thread member for connecting the cap member to the housing, between the cap member and the housing.

* * * * *